(12) United States Patent
McNutt

(10) Patent No.: US 6,604,992 B1
(45) Date of Patent: Aug. 12, 2003

(54) HVAC AIR INLET DRAIN

(75) Inventor: Rex Daniel McNutt, Auburn Hills, MI (US)

(73) Assignee: Valeo Climate Control, Corp., Auburn Hills, MI (US)

( * ) Notice: Subject to any disclaimer, the term of this patent is extended or adjusted under 35 U.S.C. 154(b) by 0 days.

(21) Appl. No.: 10/076,457

(22) Filed: Feb. 19, 2002

(51) Int. Cl.[7] .................................................. B60H 1/30
(52) U.S. Cl. ........................................................ 454/146
(58) Field of Search ................................ 454/146, 147, 454/148

(56) References Cited

U.S. PATENT DOCUMENTS

| | | | | |
|---|---|---|---|---|
| 2,011,840 A | * | 8/1935 | Arnold et al. | 237/12.3 A |
| 2,975,696 A | * | 3/1961 | Jewell | 296/208 |
| 3,157,104 A | * | 11/1964 | Nallinger | 454/147 |
| 3,327,603 A | * | 6/1967 | De Coye De Castelet | 454/127 |
| 4,235,298 A | * | 11/1980 | Sackett et al. | 123/198 E |
| 4,437,393 A | * | 3/1984 | Stolz et al. | 454/147 |
| 4,574,873 A | * | 3/1986 | Kawahira et al. | 165/42 |
| 4,597,323 A | * | 7/1986 | Mordau et al. | 454/147 |
| 4,722,265 A | * | 2/1988 | Koukal et al. | 454/147 |
| 4,819,550 A | * | 4/1989 | Ioka | 454/147 |
| 4,953,449 A | * | 9/1990 | Jackson | 454/138 |
| 5,545,085 A | * | 8/1996 | Danieau | 165/43 |

* cited by examiner

*Primary Examiner*—Derek S. Boles

(57) ABSTRACT

An HVAC system moisture collection and drainage system is disclosed. The system includes a sloped bottom wall of the system air tract recirc housing in combination with an adjacent extended trough shaped sill for redirecting collected moisture to exit the vehicle and flow into the air intake plenum mounted outside of the vehicle interior compartment. The system does not require any additional or separate structure, tooling, or drains to remove the accumulated moisture in the air recirc housing.

8 Claims, 6 Drawing Sheets

HVAC AIR INLET DRAIN

BACKGROUND OF THE INVENTION

The present invention relates to the field of moisture collection and drainage in HVAC systems. More specifically, the present invention relates to the re-direction of collected moisture in an HVAC housing element to a preexisting moisture drain external to the vehicle interior compartment.

DESCRIPTION OF THE PRIOR ART

In HVAC systems designed for vehicular applications, moisture entrained in the incoming air stream is a persistent problem. In any of the air paths chosen for the incoming and recirculated air, drains are necessarily provided at low points for the collected moisture to be drained away.

Most systems have a drain, for example, in the exterior air intake plenum for the system. The air intake plenum is typically exteriorly mounted on or near the front wall of a vehicle compartment, for example, and takes air from the cowling area of the vehicle immediately adjacent a rear portion of the engine compartment hood and/or immediately forward of the base area of the vehicle windshield. Melting ice, collected rainwater, wiper swept water, etc., can collect in this area and become a part of the incoming ventilating air for the vehicle. Moisture that separates from the air in this exterior portion of the air tract is collected in the air intake plenum outside of the interior compartment and is drained away by gravity through a drain positioned at or near a low point in the air intake plenum.

Once the incoming air has passed through the front wall of the, vehicle and has been directed to a vehicle interior upwind air tract and either through the heater core and/or A/C evaporator, another drain is provided for moisture separating in this portion of the air tract and a tube typically directs water through the front wall or vehicle floor to the vehicle exterior.

These respective drains, however, do not always effectively collect all of the moisture that is deposited as the air passes through the system. For example, as incoming air is passed through the vehicle compartment wall the incoming air typically first encounters the air recirc housing. This housing includes a door(s) that enables outside air into the vehicle interior and/or restricts incoming air and recirculates the air already present in the vehicle interior through the heater core and/or A/C evaporator segments of the vehicle ventilating air tract. Moisture collecting within this recirc housing element is left to collect in the relatively flat lower portion of this housing until dryer air passes through the housing and re-entrains the moisture or other drying action occurs. If this process takes considerable time, this collected moisture can become a source of unwelcome odor and bacterium. In addition, the continuous presence of moisture in proximity to the recirc housing seal elements can contaminate the seals with mold resulting in the same bad odors. Physical damage to the foam comprising the seals can also result when the mold acts as a gluing agent and sticks the respective seals to the recirc housing air pathways and tearing the seals upon activation of the recirc housing doors. The result is an incomplete seal between the recirc housing door and housing and airflow through the housing is no longer completely controllable.

SUMMARY OF THE INVENTION

In view of the drawbacks and disadvantages identified in the prior art, it is the object of this invention to provide a simple and reliable system for collecting and draining water ingested into the air intake system of a vehicle mounted HVAC system recirc housing. The system includes a sloped bottom wall of the vehicle interior mounted air recirc housing in combination with an extended trough shaped sill structure, located adjacent the sloped bottom wall, that directs collecting moisture to exit the vehicle interior compartment and flow exteriorly into the air intake air plenum. Owing to the necessary drain already provided in the air intake plenum, the moisture is removed from the recirc housing without the addition of a separate drain and tube inside the vehicle interior compartment.

DETAILED DESCRIPTION OF THE PREFERRED EMBODIMENT

Figure 1:
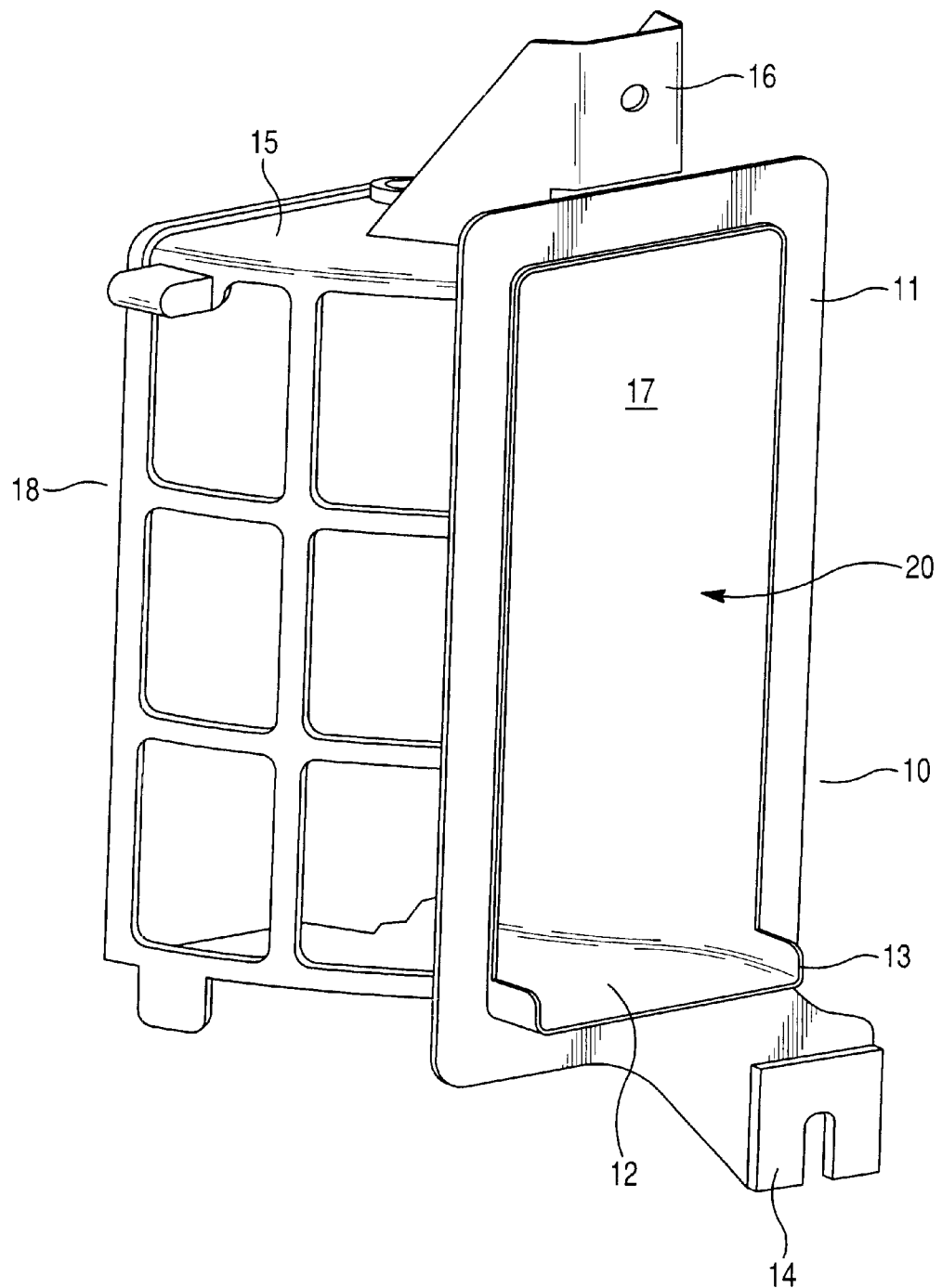
FIG. 1 is a perspective view of a recirc housing according to the present invention.
Figure 2:
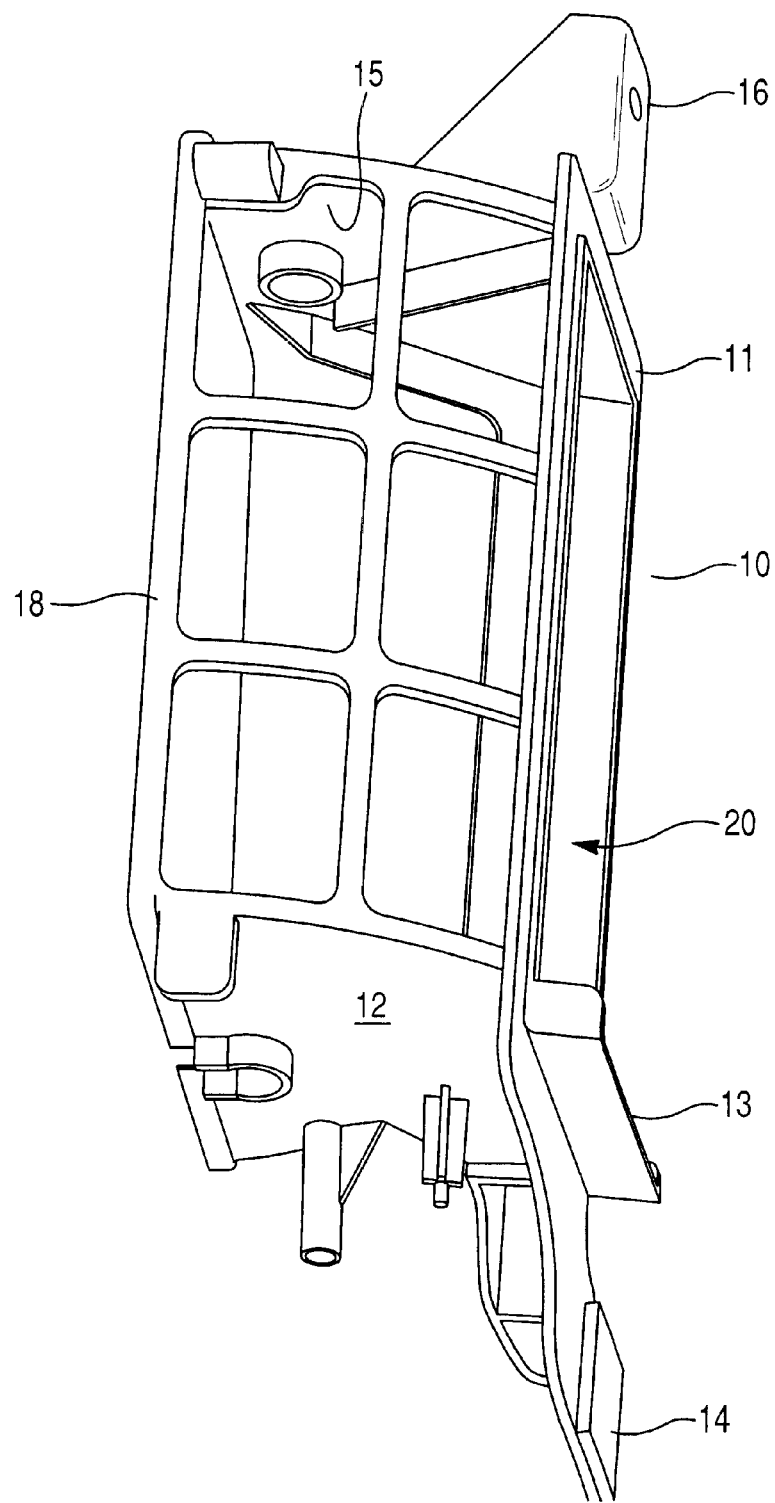
FIG. 2 is a right side perspective view of a recirc housing according to the present invention.
Figure 3:
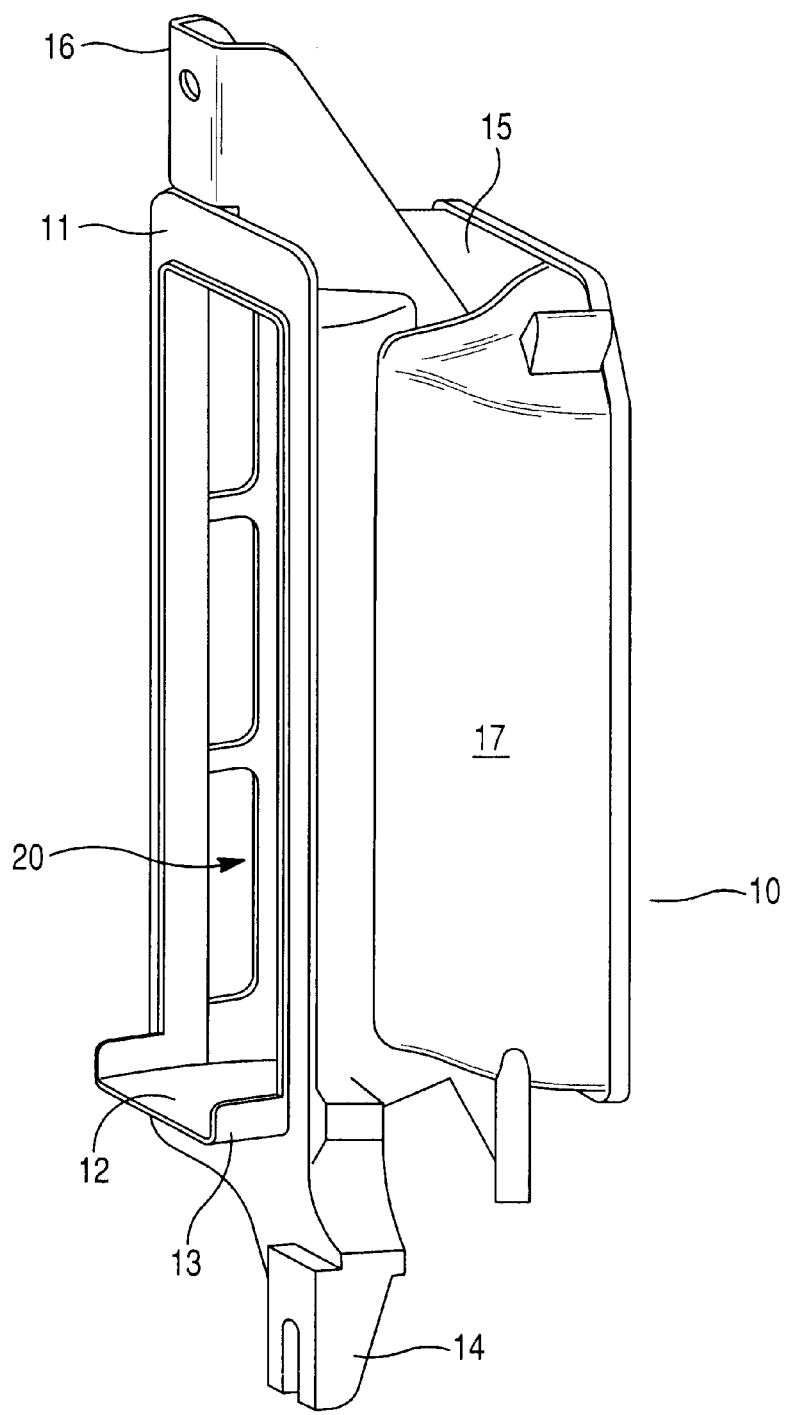
FIG. 3 is a left side perspective view of a recirc housing according to the present invention.
Figure 4:
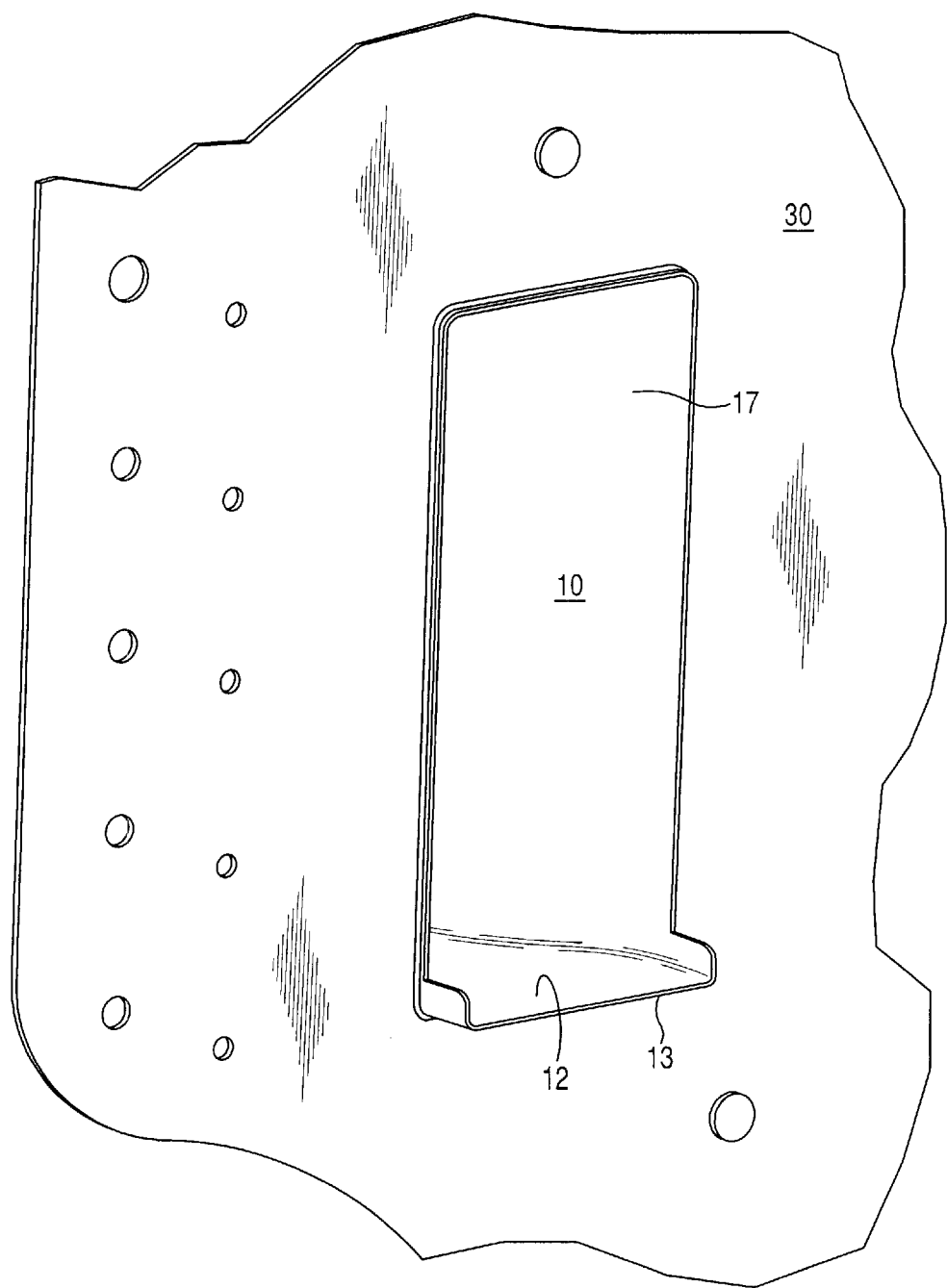
FIG. 4 shows a recirc housing according to the present invention installed in a vehicle compartment wall.
Figure 5:
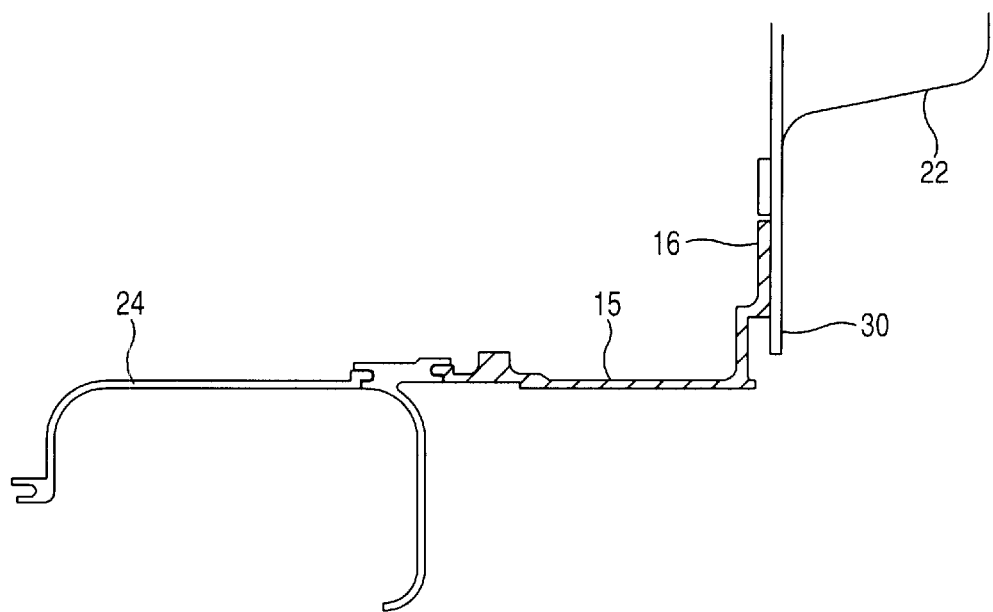
FIG. 5 is a partial sectional view of a recirc housing according to the present invention and surrounding and supporting vehicle structure.
Figure 5:
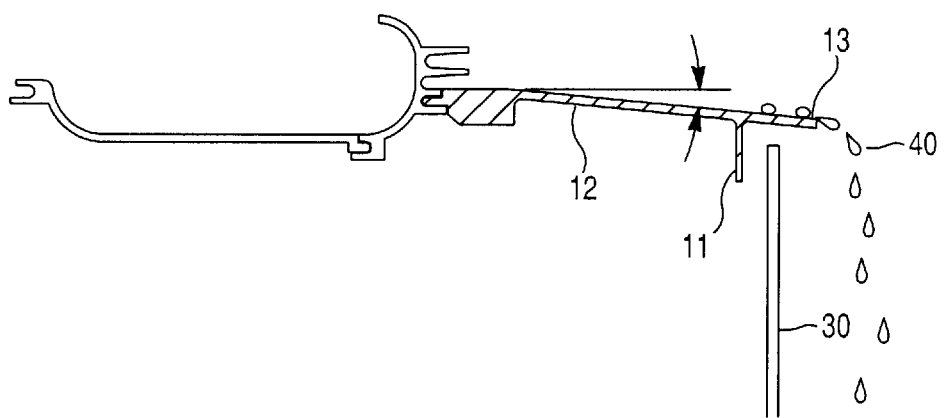

In FIG. 1 an air recirc housing according to the present invention is shown. The housing 10 is made of polypropylene, or other suitable HVAC system material (plastic or metal), and includes structure to mount the housing 10, such as upper mounting boss 16 and lower mounting boss 14, to the interior wall of a vehicle compartment. In position, the sealing lip 11, that surrounds and defines the fresh air intake pathway 20, comes into substantially sealing engagement with a corresponding aperture in vehicle compartment wall 30 (shown in FIGS. 4 & 5), and is held in position in the aperture by the respective mounting structures 14, 16. The housing 10 further includes a rearward extension comprising a lower portion forming and defining the bottom 12 of the housing and an upper portion 15 defining the top of the housing. Extending between the top 15 and bottom 12 portions of the housing 10 is an air recirc grid 18, defining a flow path for air being recirculated within the vehicle compartment. An opposite side wall 17 is also shown and extends between the top 15 and bottom 12 to complete the rearward structure of the air recirc housing 10. The rearward portion connects to a scroll structure 24 (see FIG. 5) of the HVAC system. The scroll structure 24 directs air passing through the recirc housing to further upwind HVAC tracts and also provides, for example, the mounting structure for a fan.

The housing 10 also typically includes a door (not shown) or other air directing and/or diverting structure that enables the HVAC system to select any combination of either outside (fresh) or recirculated air.

Figure 6:
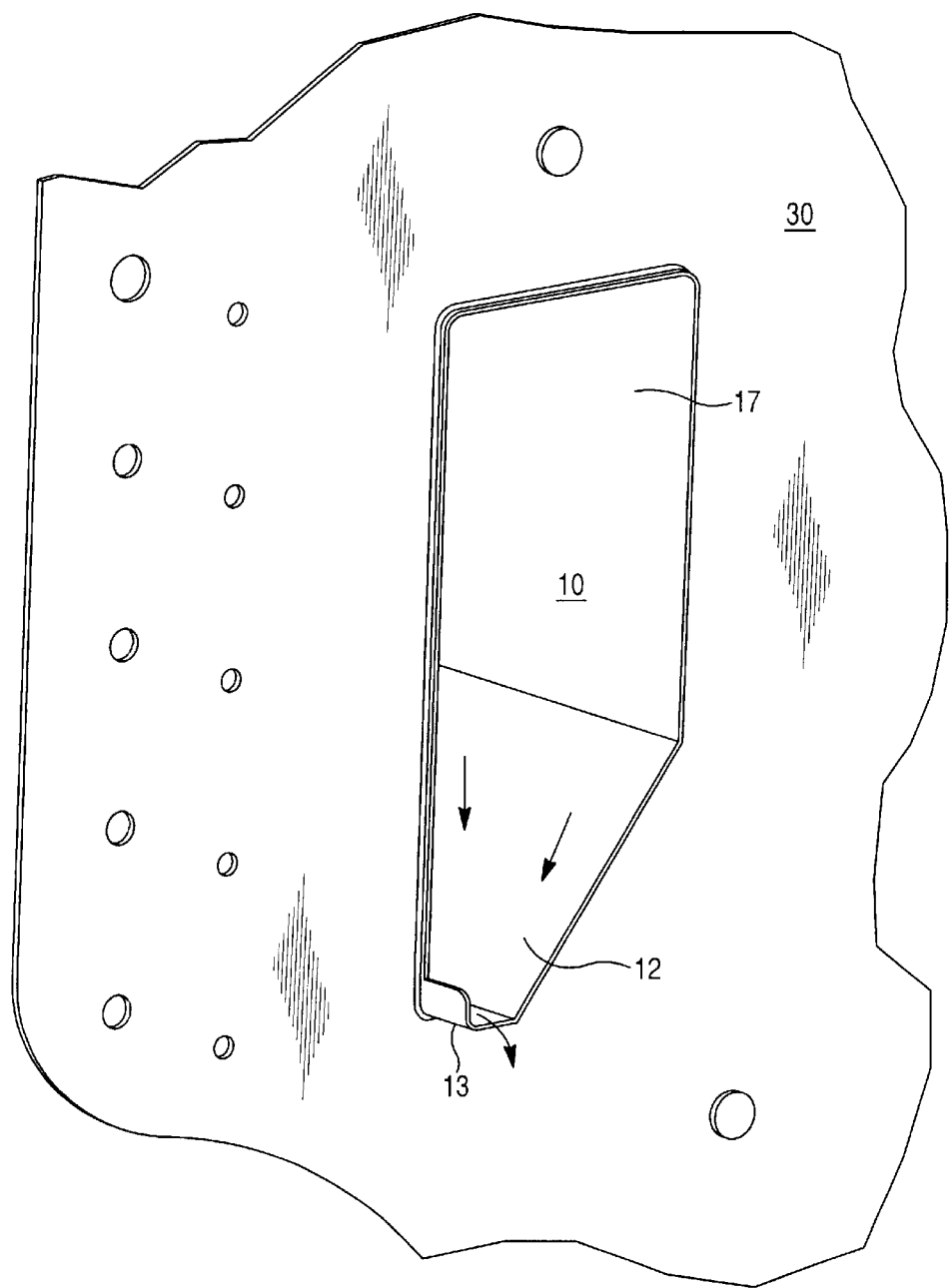
FIG. 6 shows a recirc housing according to the present invention having a bottom wall sloped in two directions and installed in a vehicle compartment wall.

The air recirc housing of this invention 10 further includes a sloped lower portion 12 and an extended sill or trough element 13 that cooperates with the sloped bottom 12 to direct moisture 40 collecting in the air recirc housing 10 to flow from inside the vehicle compartment to the air intake plenum 22 located outside the vehicle compartment. See FIG. 5. The drawings show the sill 13 as an integral part of the lower portion sloped bottom portion 12 of the air recirc housing 10, however, the sill or trough moisture diverting structure 13 may be formed from a separate piece (or pieces), as long as the sloped bottom and sill are positioned so as to cooperate and divert moisture 40 from the air recirc housing 10 to the air intake plenum 22. Likewise the sloped bottom 12 may join with extended sidewall portions to form a deeper trough. In addition, the slope of the bottom 12 may also be, in addition to outwards from the vehicle compartment, to one side or the other of the lower portion of the housing so that moisture collects within a selected portion of the trough and can be directed by this combined sloping to a predetermined location outside of the vehicle. (See FIG. 6). The purpose of the present invention being that regardless of the orientation or particular recirc housing walls in a selected vehicle installation, the lower wall(s) collaborate to create a sloped lower wall in combination with an extended sill element(s) to conduct moisture outside of the passenger compartment. By shaping and additionally sloping the lower wall(s) and/or in combination with the side wall(s) the moisture may be selectively directed to a specific location outside of the vehicle. In this manner, water may drain off of the greater portion of the sloped lower wall 12 to a single lower corner segment.

The angle selected (shown by arrows in FIG. 5) for the sloped bottom 12, in either direction (sideways or so that moisture flows outside of the vehicle compartment), with respect to the vertical or horizontal is a design consideration, and can vary from 2%, that just allows moisture to move from a static position, to a much steeper slope such as 60%. The selection depends on the expected amounts of accumulated water and the available space to orient the slope to direct water outside of the vehicle compartment.

What is claimed is:

1. An air recirc housing structure, comprising:

a front wall including an air pathway aperture for directing air there through, said front wall connecting to respective top and bottom walls extending rearwardly therefrom, and each of said top and bottom walls further connecting to rearwardly extending side walls, said bottom wall being sloped upwardly as said bottom wall proceeds rearwardly with respect to said front wall and said bottom wall including a forwardly directed extension that extends through said air pathway aperture.

2. An air recirc housing as in claim 1, wherein:

said bottom wall is sloped upwardly at an angle of between 2% and 60%.

3. An air recirc housing as in claim 1, further comprising:

respective upper and lower mounting means for attaching said housing to a vehicle compartment wall.

4. An air recirc housing comprising:

a front wall including an air pathway aperture for directing air therethrough, said front wall connecting to respective top and bottom walls extending rearwardly therefrom, and each of said top and bottom walls further connecting to rearwardly extending side walls, said bottom wall being sloped upwardly as said bottom wall proceeds rearwardly with respect to said front wall and said bottom wall including a forwardly directed extension that extends through said air pathway aperture;

respective upper and lower mounting means for attaching said housing to a vehicle compartment wall; and a grid shaped air pathway for directing recirculating air through said housing, said grid shaped air pathway forming a part of one of said rearwardly extending side walls.

5. An air recirc housing as in claim 1, wherein:

said bottom wall slope includes a sideward slope towards a sidewall.

6. An air recirc housing as in claim 5, wherein:

said sideward slope is between 2% and 60%.

7. An air recirc housing as in claim 2, wherein:

said bottom wall slope includes a sideward slope towards a sidewall.

8. An air recirc housing as in claim 7, wherein:

said sideward slope is between 2% and 60%.

* * * * *